(12) United States Patent
Sugai

(10) Patent No.: US 10,929,072 B2
(45) Date of Patent: Feb. 23, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yousuke Sugai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/679,084

(22) Filed: Nov. 8, 2019

(65) Prior Publication Data

US 2020/0159471 A1 May 21, 2020

(30) Foreign Application Priority Data

Nov. 20, 2018 (JP) ................................. 2018-217777

(51) Int. Cl.
| | | |
|---|---|---|
| *H04N 1/00* | (2006.01) | |
| *G06F 3/12* | (2006.01) | |
| *G06F 16/583* | (2019.01) | |
| *G06F 16/538* | (2019.01) | |

(52) U.S. Cl.
CPC .......... *G06F 3/1205* (2013.01); *G06F 3/1256* (2013.01); *G06F 3/1289* (2013.01); *G06F 16/538* (2019.01); *G06F 16/5854* (2019.01)

(58) Field of Classification Search
CPC .... G06F 3/1205; G06F 16/538; G06F 3/1256; G06F 3/1289
See application file for complete search history.

(56) References Cited

U.S. PATENT DOCUMENTS

| | | | | |
|---|---|---|---|---|
| 2001/0051007 | A1* | 12/2001 | Teshima ............. | H04N 1/00411 382/305 |
| 2016/0001581 | A1* | 1/2016 | Ito ...................... | H04N 1/00411 347/19 |

FOREIGN PATENT DOCUMENTS

JP 2013-45122 A 3/2013

* cited by examiner

*Primary Examiner* — Moustapha Diaby
(74) *Attorney, Agent, or Firm* — Canon U.S.A., Inc. IP Division

(57) ABSTRACT

An information processing apparatus, capable of communicating with a printing apparatus and an image server, includes an acquisition unit, a generation unit, an instruction unit, and a display control unit. The acquisition unit acquires sheet information about a sheet loaded in the printing apparatus. The generation unit generates a search condition for causing the image server to search for image data, based on the acquired sheet information. The instruction unit causes the image server to execute search processing based on the search condition. The display control unit displays a screen displaying a result of the search processing that is executed based on the search condition by the image server.

19 Claims, 13 Drawing Sheets

FIG.5A

LET'S PRINT MASTERPIECE

SEARCH BASED ON SETTING YOU LIKE

KEYWORD
ENTER TEXT YOU LIKE [SEARCH] }501

SEARCH USING ARTIST NAME
ENTER ARTIST NAME [SEARCH] }502

SEARCH USING CATEGORY
UKIYOE ▽ [SEARCH] }503

FIG.5B

LET'S PRINT MASTERPIECE

SEARCH SETTING: ARTIST AAA
SEARCH RESULT (1) PICTURE MO
IMAGE SIZE: 2048 × 1600
UPLOAD PERSON: R MUSEUM [VIEW PICTURE] [PRINT]

(2) PICTURE MO  504 505
IMAGE SIZE: 640 × 480
UPLOAD PERSON: U MUSEUM [VIEW PICTURE] [PRINT]

(3) PICTURE MO
IMAGE SIZE: 1024 × 800
UPLOAD PERSON: PICTURE PRESERVATION ORGANIZATION A [VIEW PICTURE] [PRINT]

(4) PICTURE JU
IMAGE SIZE: 2048 × 1600
UPLOAD PERSON: R MUSEUM [VIEW PICTURE] [PRINT]

FIG.5C

LET'S PRINT MASTERPIECE

SEARCH SETTING: KEYWORD "SEA"
SEARCH RESULT (1) PICTURE KANA
ARTIST: KATU
IMAGE SIZE: 620 × 300
UPLOAD PERSON: PICTURE PRESERVATION ORGANIZATION B [VIEW PICTURE] [PRINT]

(2) PICTURE SANKA
ARTIST: URA
IMAGE SIZE: 840 × 500
UPLOAD PERSON: PICTURE PRESERVATION ORGANIZATION B [VIEW PICTURE] [PRINT]

(3) PICTURE V
ARTIST: SAN
IMAGE SIZE: 2048 × 1600
UPLOAD PERSON: R MUSEUM [VIEW PICTURE] [PRINT]

FIG.5D

LET'S PRINT MASTERPIECE

PICTURE MO

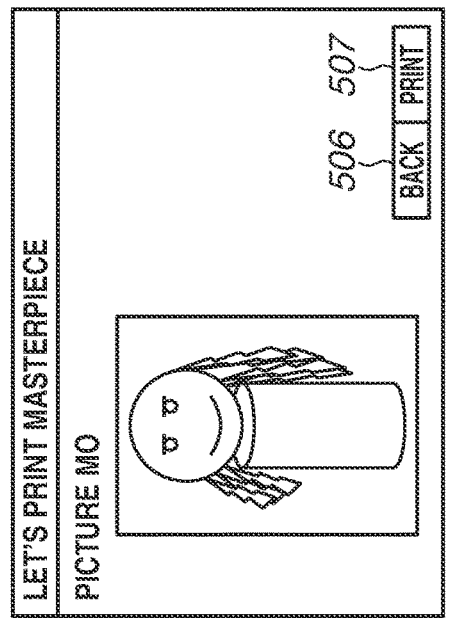

506 507
[BACK] [PRINT]

FIG.6

| ID | TITLE | IMAGE URL | IMAGE SIZE | ARTIST | KEYWORD | UPLOAD PERSON | CATEGORY INFORMATION |
|---|---|---|---|---|---|---|---|
| 1 | PICTURE MO | http://..... | 2048 × 1600 | AAA | HUMAN | R MUSEUM | WESTERN PAINTING, OIL PAINTING |
| 2 | PICTURE MO | http://..... | 640 × 480 | AAA | HUMAN | U MUSEUM | WESTERN PAINTING, OIL PAINTING |
| 3 | PICTURE MO | http://..... | 1024 × 800 | AAA | HUMAN | PICTURE PRESERVATION ORGANIZATION A | WESTERN PAINTING, OIL PAINTING |
| 4 | PICTURE JU | http://..... | 2048 × 1600 | AAA | ANGEL | R MUSEUM | WESTERN PAINTING, OIL PAINTING |
| 5 | PICTURE MIN | http://..... | 2048 × 1000 | DRA | HUMAN, GODDESS | R MUSEUM | WESTERN PAINTING, OIL PAINTING |
| 6 | PICTURE KANA | http://..... | 620 × 300 | KATU | SEA | PICTURE PRESERVATION ORGANIZATION B | UKIYOE, BLOCK PRINT, JAPANESE PAINTING |
| 7 | PICTURE SAN | http://..... | 840 × 500 | UTA | HUMAN, MOUNTAIN, SEA | PICTURE PRESERVATION ORGANIZATION B | UKIYOE, BLOCK PRINT, JAPANESE PAINTING |
| 8 | PICTURE V | http://..... | 2048 × 1600 | SA | SEA, GODDESS | R MUSEUM | WESTERN PAINTING, OIL PAINTING |

FIG.7

| SHEET SIZE | RECOMMENDED HEIGHT SIZE | RECOMMENDED WIDTH SIZE |
|---|---|---|
| A4 | 1500 | 1000 |
| POSTCARD | 900 | 600 |
| L SIZE | 600 | 400 |

FIG.8

| SHEET TYPE | RECOMMENDED CATEGORY |
|---|---|
| PLAIN PAPER | MODERN ART |
| MATTE PAPER | WESTERN PAINTING |
| PHOTO PAPER | PHOTO, SCULPTURE, MODERN ART |
| JAPANESE PAPER | BLOCK PRINT, JAPANESE PAINTING |

FIG. 9A http://IMAGE SERVER.com/search?Artist=AAA&height>=1500&width>=1000&category=WESTERN PAINTING

FIG. 9B

```
{
 list[
  {id=1,Name=PICTURE M,URL=http://......,size=2048x1600,Artist=AAA,Upload="R MUSEUM",Category=WESTERN PAINTING/OIL PAINTING},
  {id=4,Name=PICTURE JU,URL=http://......,size=2048x1600,Artist=AAA,Upload="R MUSEUM",Category=WESTERN PAINTING/OIL PAINTING},
 ]
}
```

FIG. 9C http://IMAGE SERVER.com/search?category=WESTERN PAINTING&height>=1500&width>=1000

FIG. 9D

```
{
 list[
  {id=1,Name=PICTURE M,URL=http://......,size=2048x1600,Artist=AAA,Upload="R MUSEUM",Category=ESTERN PAINTING/OIL PAINTING},
  {id=4,Name=PICTURE JU,URL=http://......,size=2048x1600,Artist=AAA,Upload="R MUSEUM",Category=ESTERN PAINTING/OIL PAINTING},
  {id=5,Name=PICTURE MIN,URL=http://......,size=2048x1600,Artist=AAA,Upload="R MUSEUM",Category=ESTERN PAINTING/OIL PAINTING},
 ]
}
```

FIG.12

LET'S PRINT MASTERPIECE

JAPANESE PAPER IS LOADED IN PRINTER.
PRINTING WESTERN PAINTING ON JAPANESE
PAPER IS NOT RECOMMENDED.

CHANGE PAPER LOADED IN PRINTER OR
CHANGE CATEGORY.

* PAPER RECOMMENDED FOR WESTERN
  PAINTING IS MATTE PAPER

1201 CHANGE CATEGORY

1202 CONTINUE SEARCH

INFORMATION PROCESSING APPARATUS, CONTROL METHOD, AND STORAGE MEDIUM

BACKGROUND

Field

The present disclosure relates to an information processing apparatus, a control method, and a storage medium.

Description of the Related Art

Japanese Patent Application Laid-Open No. 2013-45122 discusses a search processing technique in which a search keyword is used for an image data search.

While an image data search can be performed using a search keyword with such a conventional technique, acquiring information about a printing apparatus, and performing a search using the acquired information are not discussed. Therefore, the user sometimes obtain an undesired output result when a user gives an instruction for printing using image data obtained as a result of a search.

SUMMARY

According to an aspect of the present disclosure, an information processing apparatus, capable of communicating with a printing apparatus and an image server, includes an acquisition unit configured to acquire sheet information about a sheet loaded in the printing apparatus, a generation unit configured to generate a search condition for causing the image server to search for image data, based on the acquired sheet information, an instruction unit configured to cause the image server to execute search processing based on the search condition, and a display control unit configured to display a screen displaying a result of the search processing that is executed based on the search condition by the image server.

Further features of the present disclosure will become apparent from the following description of exemplary embodiments with reference to the attached drawings.

BRIEF DESCRIPTION OF THE DRAWINGS

FIGS. 5A to 5D are diagrams each illustrating an example of a screen which is provided by an application.

FIG. 6 is a diagram illustrating an example of an image database.

FIG. 7 is a diagram illustrating an example of a recommended image size table.

FIG. 8 is a diagram illustrating an example of a recommended category table.

FIGS. 9A, 9B, 9C, and 9D are diagrams illustrating examples of search requests and search results.

FIG. 12 is a diagram illustrating an example of a screen which is provided by the application.

DESCRIPTION OF THE EMBODIMENTS

Exemplary embodiments of the present disclosure will be described in detail below with reference to the attached drawings.

(System Configuration)

Figure 1:
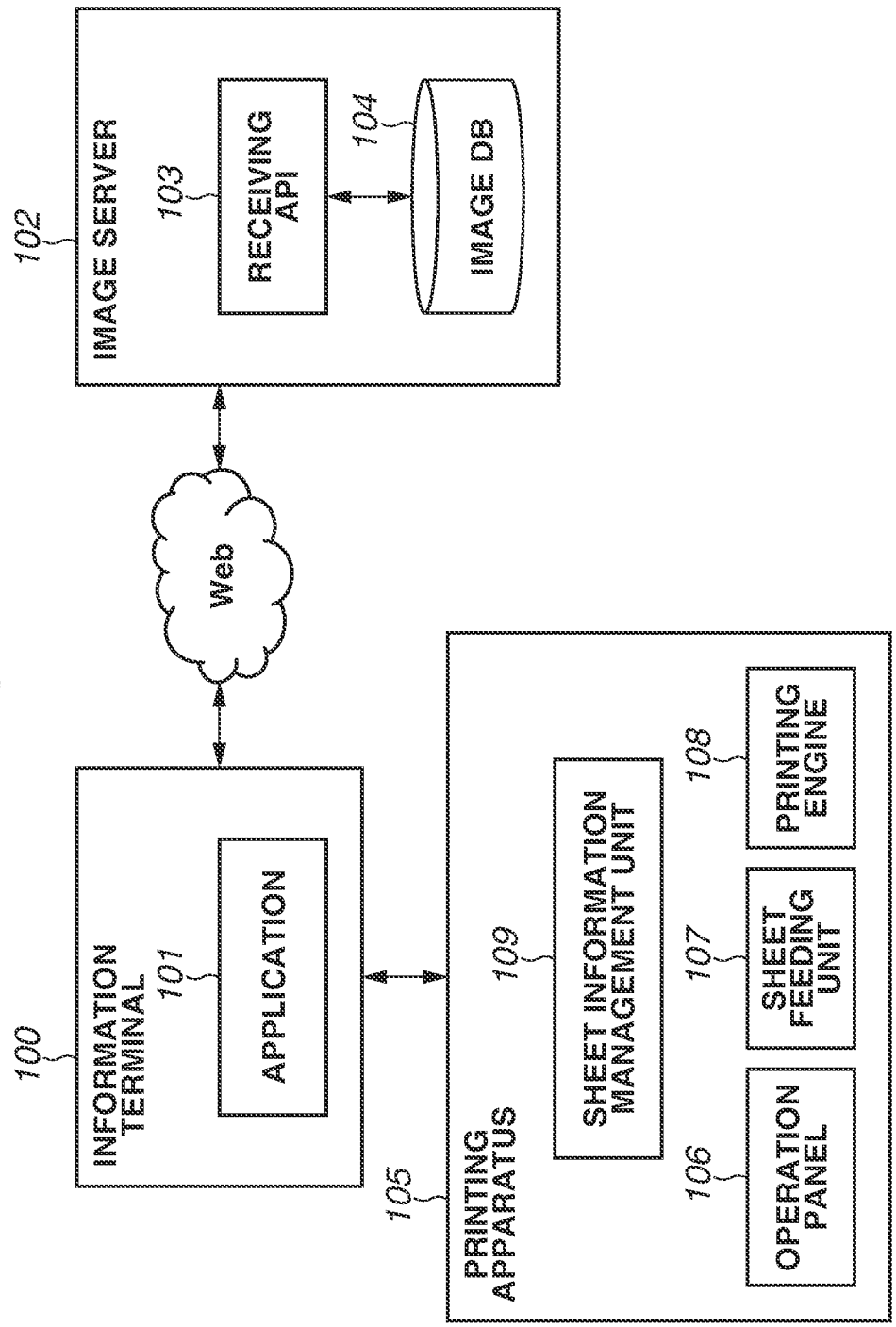
FIG. 1 is a diagram illustrating a configuration example of a system.

FIG. 1 is a diagram illustrating a configuration example of a system according to a first exemplary embodiment. This system includes an information terminal 100, such as a smartphone or a laptop personal computer (PC), an image server 102, and a printing apparatus 105. The information terminal 100 is connected to the image server 102 and the printing apparatus 105 to communicate with each other. More specifically, the information terminal 100 and the image server 102 are connected via the Internet. The information terminal 100 and the printing apparatus 105 are connected via, for example, a wired local area network (LAN), a wireless LAN, or a Universal Serial Bus (USB) component. The information terminal 100 includes an application 101 that issues an instruction for an image search. The image server 102 includes a receiving application programming interface (API) 103 that receives an instruction from the application 101, and an image database (DB) 104 that stores image data to be a search target. The printing apparatus 105 includes an operation panel 106 that receives a user operation, a sheet feeding unit 107 that feeds sheets to be used for printing, and a printing engine 108 that executes print processing. While inkjet printing is used in the present exemplary embodiment, an electrophotographic system may be used. The printing apparatus 105 further includes a sheet information management unit 109. The sheet information management unit 109 manages sheet information about sheets loaded in the sheet feeding unit 107. A method for setting the sheet information will be described below with reference to FIGS. 3A to 3C.

Figure 2:
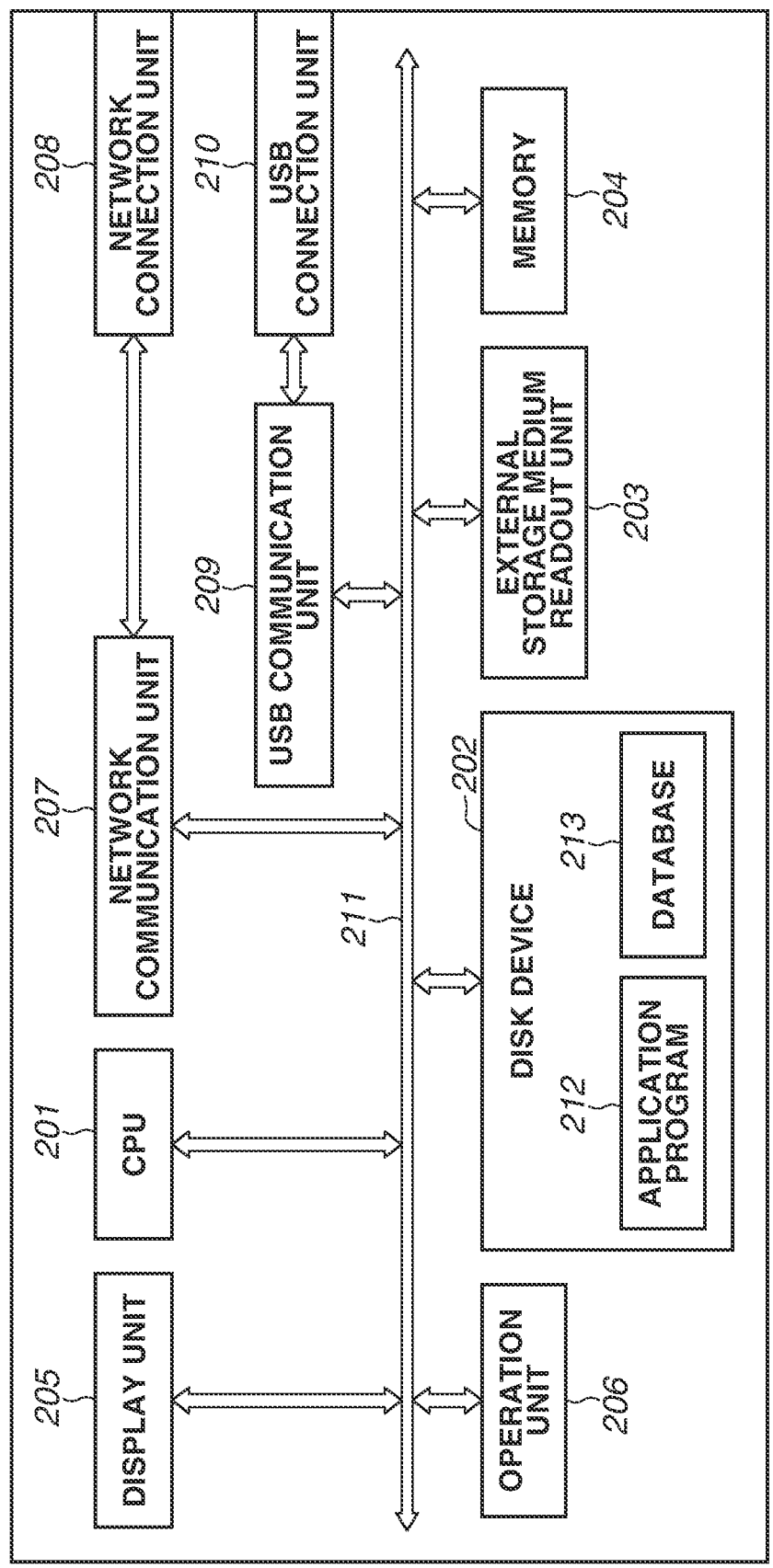
FIG. 2 is a diagram illustrating a hardware configuration example of an information processing apparatus.

FIG. 2 is a hardware block diagram illustrating the information terminal 100 (an information processing apparatus). A central processing unit (CPU) 201 controls the components to be described below. A disk device 202 stores an application program 212, a database 213, an operating system (OS), and various files that are read out by the CPU 201. An external storage medium readout unit 203 reads out information, for example, a file stored in an external storage medium, such as a Secure Digital (SD) card. A memory 204 is, for example, a random access memory (RAM). The CPU 201 temporarily stores data or buffers data into the memory 204 as appropriate. A display unit 205 is, for example, a liquid crystal display (LCD), and displays various kinds of information. An operation unit 206 includes a keyboard and a mouse with which the user performs various input operations. A network communication unit 207 is connected to a network, such as the Internet, via a network connection unit 208, and performs various communications. The network communication unit 207 supports a wired LAN or a wireless LAN. The network connection unit 208 serves as a connector for connecting a wired LAN cable in a case of using the wired LAN, and the network connection unit 208 serves as an antenna in a case of using the wireless LAN. The network connection unit 208 may support both of the wired LAN and the wireless LAN. A USB communication unit 209 is connected to various peripheral devices via a USB connection unit 210, and performs various communications. The above-described components are connected with each other via a bus 211.

Figure 3A:
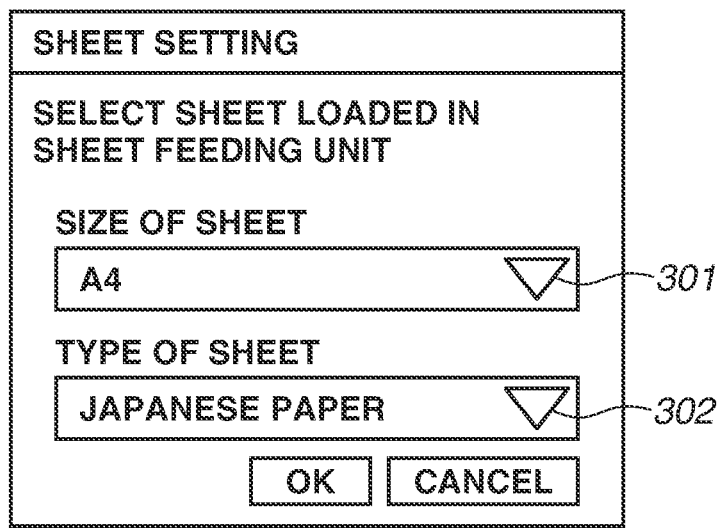
FIGS. 3A, 3B, and 3C are diagrams each illustrating an example of a screen which is displayed in a printing apparatus.
Figure 3B:
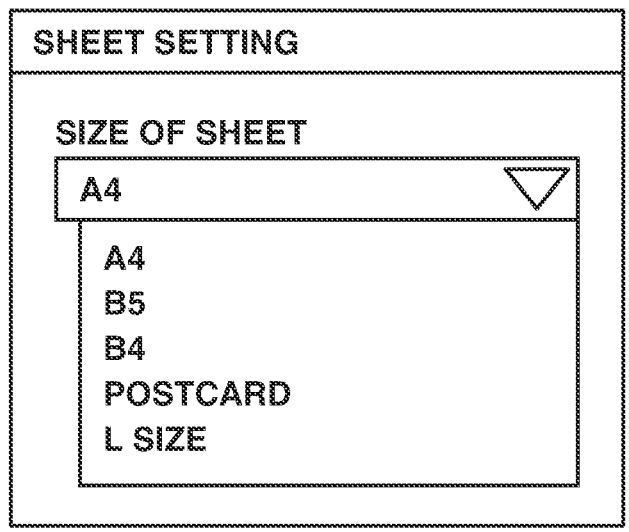
Figure 3C:
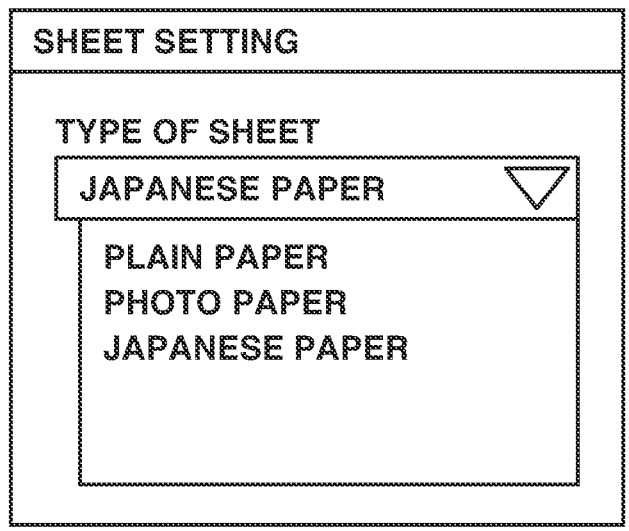

FIGS. 3A, 3B, and 3C are diagrams each illustrating an example of a screen which is displayed on the operation panel 106 of the printing apparatus 105. The screen in FIG. 3A is displayed on the operation panel 106 after the user opens the sheet feeding unit 107, loads a desired sheet in the sheet feeding unit 107, and mounts the sheet feeding unit 107 into the printing apparatus 105. The user sets the size and the type of the sheet in the sheet feeding unit 107 using the displayed screen. With a user operation on a pull-down menu 301 in FIG. 3A, a screen in FIG. 3B is displayed. With a user operation on a pull-down menu 302 in FIG. 3A, a screen in FIG. 3C is displayed. In a case where the user presses an OK button in FIG. 3A after selecting the size in the screen in FIG. 3B and the type in the screen in FIG. 3C, the sheet size and the sheet type set by the user are managed by the sheet information management unit 109 of the printing apparatus 105. While a sheet size and a sheet type are determined by the user using the screens and registered as described above as illustrated in FIGS. 3A to 3C, a sheet size and a sheet type may be automatically determined by a sensor included in the printing apparatus 105 and registered.

Figure 4:
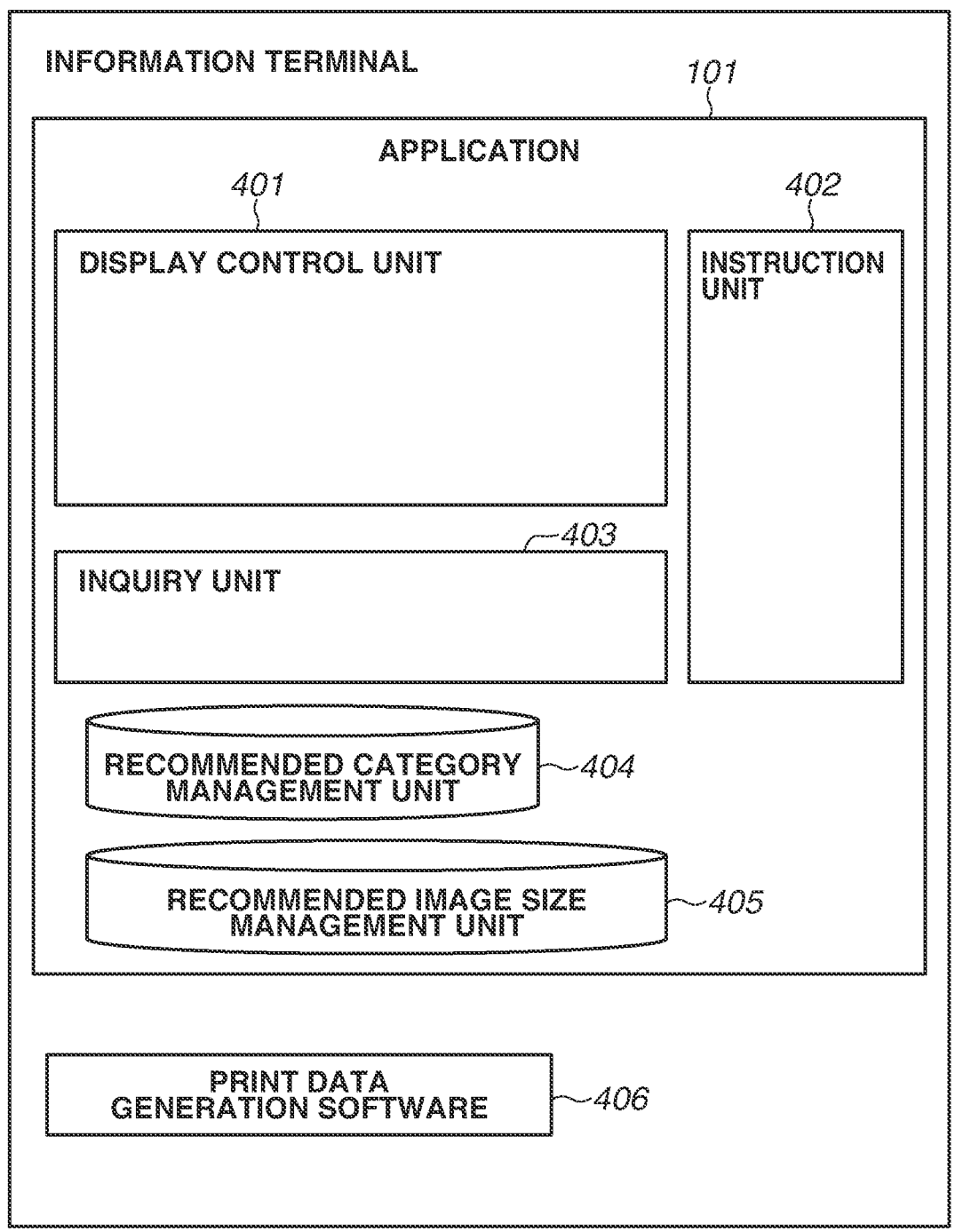
FIG. 4 is a diagram illustrating a configuration example of software operating in the information processing apparatus.

FIG. 4 is a diagram illustrating a configuration of software operating in the information terminal 100. The information terminal 100 includes the application 101 and print data generation software 406. The application 101 will be described first. A display control unit 401 displays screens to be described below with reference to FIGS. 5A to 5D and FIG. 12. An instruction unit 402 operates in exchanging information with the image server 102, in response to a user operation received by the application 101. For example, the instruction unit 402 transmits a request, such as a search request for image data or an acquisition request for image data, to the image server 102. An inquiry unit 403 acquires sheet information about a sheet loaded in the printing apparatus 105. A recommended category management unit 404 manages a table to be described below with reference to FIG. 8. A recommended image size management unit 405 manages a table to be described below with reference to FIG. 7. These tables are stored in, for example, the disk device 202 (a storage unit) of the information terminal 100.

Next, the print data generation software 406 will be described. The print data generation software 406 operates when a print button in FIG. 5B, FIG. 5C, or FIG. 5D to be described below is pressed. More specifically, the print data generation software 406 generates print data based on image data to be printed and print setting information that are designated by the application 101, and transmits the generated print data to the printing apparatus 105. The print data generation software 406 is, for example, a printer driver supported by the printing apparatus 105. While the application 101 and the print data generation software 406 are described as separate pieces of software in the present exemplary embodiment, the application 101 may have a function corresponding to the print data generation software 406. The print data generation software 406 may be standard print data generation software of the OS for the information processing apparatus.

FIGS. 5A to 5D are diagrams each illustrating a screen to be displayed by the display control unit 401 of the application 101. The user searches for a desired picture using the screen in FIG. 5A. The screen in FIG. 5A includes an item 501 for a search with a keyword, an item 502 for a search with an artist name, and an item 503 for a search with a category. For example, in a case where "AAA" is input as an artist name into the item 502 and then a search button is pressed by the user, a search request including the keyword input in the screen in FIG. 5A is notified to the receiving API 103 of the image server 102. Subsequently, a search is performed in the image DB 104 to find a picture corresponding to the keyword. The image server 102 transmits the result of the search to the application 101, as a response to the search request. Upon receiving this response, the application 101 displays the screen in FIG. 5B. The screen in FIG. 5B indicates that four pictures are found by the search as a picture of the artist name AAA. Pictures (1) to (3) are the same picture titled "picture MO", and are different in terms of upload person and image size (pixel count). A picture (4) is a picture titled "picture JU". In a case where "sea" is input as a keyword into the item 501 in FIG. 5A and then the search button is pressed by the user, a search request including the keyword input in the screen in FIG. 5A is notified to the receiving API 103 of the image server 102. Subsequently, a search is performed in the image DB 104 to find a picture corresponding to the keyword. The image server 102 transmits the result of the search to the application 101 as a response to the search request. Upon receiving the response, the application 101 displays the screen in FIG. 5C.

When the user presses a button 504 in FIG. 5B, the image data of the picture MO, i.e., the picture (2), is displayed on the display unit 205 as illustrated in FIG. 5D. More specifically, the application 101 transmits a display request including the uniform resource locator (URL) of the picture selected by the user to the image server 102. As a response to the display request, the image server 102 transmits thumbnail data of the image data corresponding to the URL to the application 101. The application 101 displays the screen in FIG. 5D by displaying the received thumbnail data. When the user presses a print button 507 in FIG. 5D, a print request including the URL of the displayed picture is transmitted to the image server 102, and the image server 102 transmits image data corresponding to identification information about the displayed picture to the application 101. The application 101 can therefore instruct the printing apparatus 105 to print the displayed picture (2). On a print setting screen that is displayed by pressing the print button 507, the user may set the print setting information using the displayed print setting screen. In this case, the displayed print setting screen may already include initial values of a sheet size and a sheet type acquired by processing to be described below. While the instruction for printing is issued after the screen is displayed in FIG. 5D as an example in the present exemplary embodiment, an instruction for printing may be issued without displaying the screen in FIG. 5D in a case where a print button 505 in FIG. 5B is pressed by the user. The printing apparatus 105 that performs the print processing may be, for example, a printing apparatus managed by the OS as a default printer, or may be selected by using a screen displayed by the application 101.

An example of a case of printing using the screens in FIGS. 5A to 5D will be described. For example, an A4-size sheet is loaded in the printing apparatus 105. Further, for example, the recommended number of pixels of image data to be printed on an A4-size sheet is 1500 (height)×1000 (width). In this example case, there arises an issue that a picture (i.e., each of the pictures (2) and (3)) having the number of pixels less than the number of recommended pixels may be listed in the screen in FIG. 5B as a search result of a search performed by using only the information input by the user into the screen in FIG. 5A. If the user presses the print button 505 in the displayed screen in FIG. 5B, the user may obtain an unsatisfactory printed product.

FIG. 6 is a diagram illustrating an example of the image DB 104 managed in the image server 102. For example, eight pieces of image data are stored in the image DB 104. Each piece of the image data is associated with a name (title), an image URL indicating an image-data storing location, an image size, an artist, a keyword, an upload person, and category information. The image server 102 executes search processing using a search condition received from the application 101 and various kinds of information in the image DB 104, and executes processing for acquiring image data.

FIG. 7 is a diagram illustrating an example of a table of recommended image size information managed by the recommended image size management unit 405 of the application 101. The application 101 manages size information about a lower limit recommended for each sheet size. For example, the application 101 stores 1500 as the number of recommended pixels in the height direction and 1000 as the number of recommended pixels in the width direction for the sheet size A4.

FIG. 8 is a diagram illustrating an example of a table of recommended category information managed by the recommended category management unit 404 in the application 101. The application 101 manages category information recommended for each sheet type. For example, a sheet type of "plain paper" is managed in association with "modern art" as a recommended category.

Figure 10:
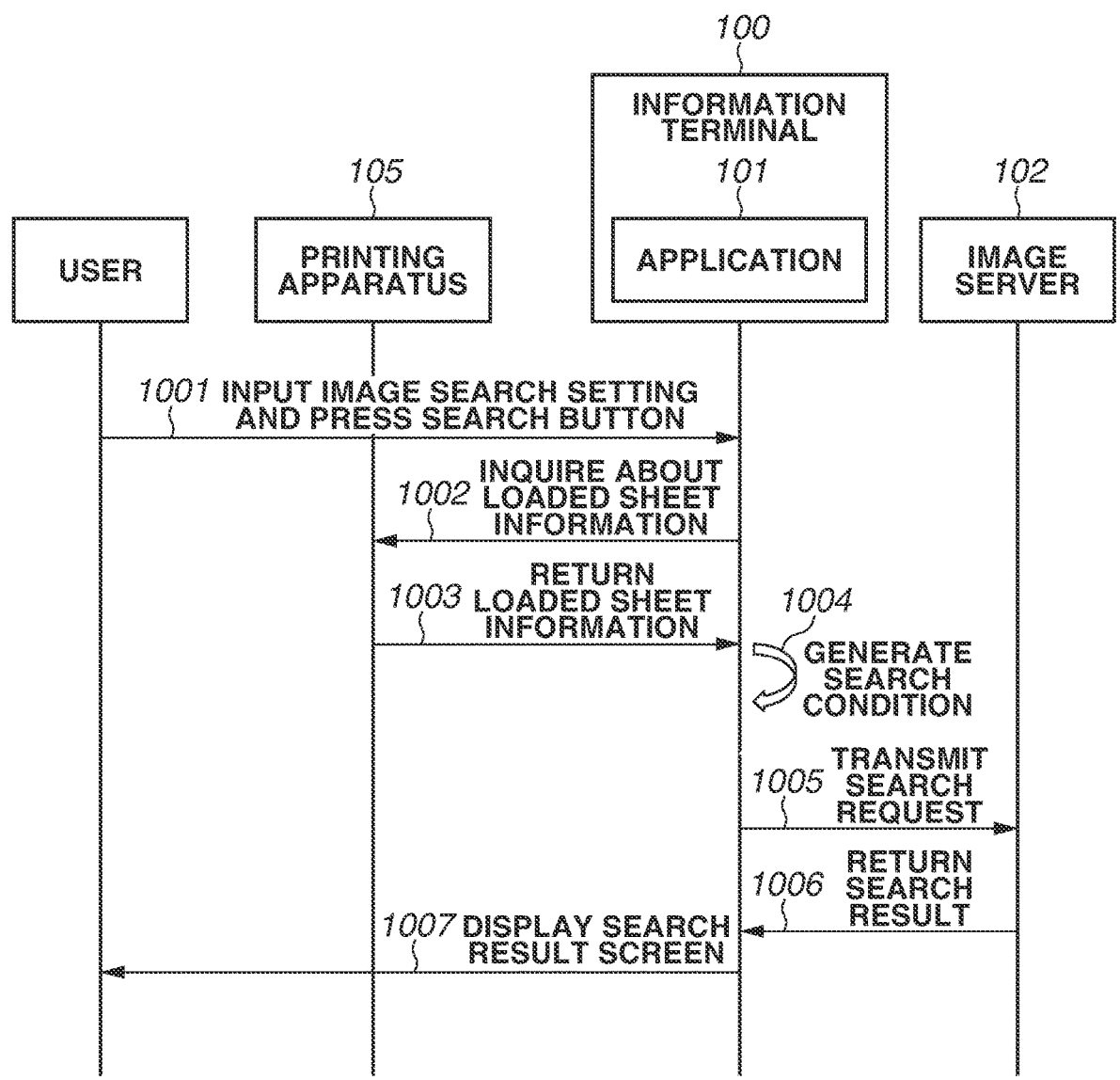
FIG. 10 is a sequence diagram illustrating processing of the system.

FIGS. 9A to 9D are diagrams illustrating examples of search requests transmitted from the application 101 to the image server 102 and search results returned from the image server 102 to the application 101. FIG. 10 is a sequence diagram illustrating processing for a search that is performed by the user using the application 101.

The user inputs setting information, for example, a search keyword, using the above-described screen in FIG. 5A, and presses the search button (1001). Upon receiving the search instruction, the application 101 sends an inquiry about the sheet information about a sheet loaded in the printing apparatus 105 to the printing apparatus 105 (1002). The printing apparatus 105 returns a sheet size and a sheet type registered using the above-described screens in FIGS. 3A to 3B, as a response to the inquiry (1003). The application 101 generates a search condition (1004), based on the setting information received in 1001 and the sheet size and the sheet type received from the printing apparatus 105. The application 101 transmits a search request based on the generated search condition to the image server 102 (1005). The image server 102 searches for image data corresponding to the received search condition in the image DB 104, and returns a result of the search (1006). In the present exemplary embodiment, an artist, an image size, and an upload person are returned as the result of the search. The application 101 displays a screen displaying the result of the search executed by the image server 102 based on the search condition transmitted in 1005 (1007).

For example, in a case where the user inputs AAA as an artist name using the screen in FIG. 5A and presses the search button, the search request illustrated in FIG. 9A is transmitted to the image server 102 after the above-described process in 1004. In this example, A4-size matte paper is registered in the printing apparatus 105.

Upon receiving the search request in FIG. 9A, the image server 102 returns the search result in FIG. 9B. As a result, the application 101 can display a search result screen similar to the screen described above with reference to FIG. 5B. The search result screen in FIG. 9B is different from the search result screen in FIG. 5B in that a list of image data excluding image data having the insufficient number of pixels is displayed.

Further, for example, in a case where the user selects Western painting as a category using the screen in FIG. 5A and presses the search button, the search request illustrated in FIG. 9C is transmitted to the image server 102 after the above-described process in 1004.

Upon receiving the search request in FIG. 9C, the image server 102 returns the search result in FIG. 9D. As a result, the application 101 can display a search result screen similar to the screen described above with reference to FIG. 5C. The search result screen in FIG. 9C is different from the search result screen in FIG. 5C in that a list of image data excluding image data having the insufficient number of pixels is displayed.

Figure 11:
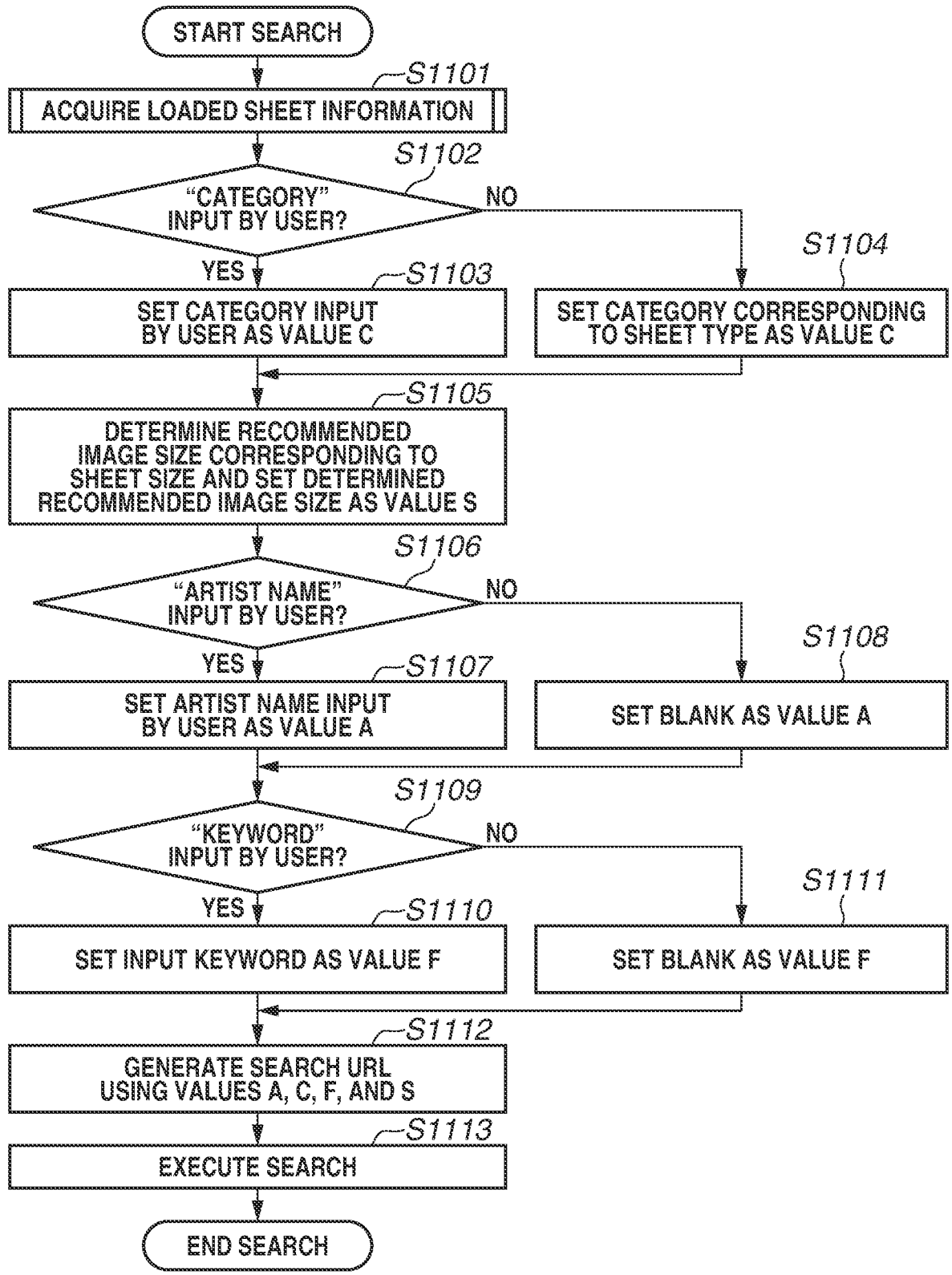
FIG. 11 is a diagram illustrating an example of a flowchart.

FIG. 11 is a flowchart illustrating search condition generation processing which is executed by the application 101. The CPU 201 reads out a program related to a processing procedure in the flowchart from the memory and executes the read-out program, to implement the processing in FIG. 11. The processing in FIG. 11 is executed in a case where the search button of any one of the items 501 to 503 in FIG. 5A is pressed.

In step S1101, the CPU 201 acquires the sheet information from the sheet information management unit 109 of the printing apparatus 105. In step S1102, the CPU 201 determines whether the search processing using the category in the screen in FIG. 5A (the search processing using the item 503) is selected. In a case where the CPU 201 determines that the search processing using the category is selected (YES in step S1102), the processing proceeds to step S1103. In step S1103, the CPU 201 sets the category input by the user using the screen in FIG. 5A, as a value C. For example, in a case where the user selects "ukiyoe" using the item 503 in FIG. 5A, the CPU 201 sets "ukiyoe" as the value C. In a case where the CPU 201 determines that the search processing using the category is not selected (NO in step S1102), the processing proceeds to step S1104. In step S1104, the CPU 201 sets the category recommended based on the sheet type acquired in step S1101 as the value C. For example, in a case where "matte paper" is acquired as a sheet type from the printing apparatus 105 in step S1101, the CPU 201 identifies "Western painting" as the recommendation category by referring to the recommended category table in FIG. 8, and sets the identified "Western painting" as the value C.

In step S1105, the CPU 201 determines a recommended image size based on the sheet size information acquired in step S1101 and the table storing the recommended image size information in FIG. 7, and sets the determined recommended image size as a value S. For example, in a case where "A4" is acquired as the sheet size from the printing apparatus 105 in step S1101, the CPU 201 identifies "1500× 1000" as the recommendation image size by referring to the recommended image size table in FIG. 7, and sets the identified size as the value S.

In step S1106, the CPU 201 determines whether the search processing using the artist name in the screen in FIG. 5A (the search processing using the item 502) is selected. In a case where the CPU 201 determines that the search processing using the artist name is selected (YES in step S1106), the processing proceeds to step S1107. In step S1107, the CPU 201 sets the artist name input by the user using the screen in FIG. 5A, as a value A. For example, in a case where the user inputs "AAA" as the artist name using the item 502 in FIG. 5A, the CPU 201 sets "AAA" as the value A. In a case where the CPU 201 determines that the search processing using the artist name is not selected (NO in step S1106), the processing proceeds to step S1108. In step S1108, the CPU 201 leaves the value A blank. Since the setting processing in step S1108 is performed to indicate that no artist name is input by the user, the processing in step S1108 may be omitted.

In step S1109, the CPU 201 determines whether the search processing using a keyword in the screen in FIG. 5A (the search processing using the item 501) is selected. In a case where the CPU 201 determines that the search processing using a keyword is selected (YES in step S1109), the processing proceeds to step S1110. In step S1110, the CPU 201 sets the keyword input by the user using the screen in FIG. 5A, as a value F. For example, in a case where the user inputs "sea" as the keyword using the item 501 in FIG. 5A, the CPU 201 sets "sea" as the value F. In a case where the CPU 201 determines that the search processing using the keyword is not selected (NO in step S1109), the processing proceeds to step S1111. In step S111, the CPU 201 leaves the value F blank. Since the setting processing in step S1111 is performed to indicate that no keyword is input by the user, step S1111 may be omitted.

In step S1112, the CPU 201 generates a search URL using the values A, C, F, and S. For example, in a case where "matte paper" is acquired as the sheet type from the printing apparatus 105 in step S1101 and the user inputs AAA as the artist name using the screen in FIG. 5A and then presses the search button, the search URL illustrated in FIG. 9A is generated as a result of the processing in FIG. 11. More specifically, although the information input by the user using the screen in FIG. 5A is only the artist name AAA, "category=Western painting" is included in the search URL in FIG. 9A as a result of generating the search URL using the value C set in step S1104. Further, "height>=1500 & width>=1000" is included in the search URL in FIG. 9A as a result of generating the search URL using the value S set in step S1105. With this processing, image data having the number of pixels less than the recommended number of pixels based on the sheet size acquired in step S1101 is not displayed as the search result, which can improve the user convenience. Moreover, image data of a category not recommended for the sheet type acquired in step S1101 is not displayed as the search result, which can improve the user convenience.

As another example, in a case where the user selects Western painting as the category using the screen in FIG. 5A and presses the search button, the search URL illustrated in FIG. 9C is generated as a result of the processing in FIG. 11. More specifically, although the information input by the user using the screen in FIG. 5A is only Western painting which is input as the category, "height>=1500 & width>=1000" is included in the search URL in FIG. 9C as a result of generating the search URL using the value S set in step S1105. With this processing, image data having the number of pixels less than the recommended number of pixels based on the sheet size acquired in step S1101 is not displayed as the search result, which can improve the user convenience.

In step S1113, the CPU 201 requests the image server 102 to execute the search processing using the search URL generated in step S1112. Step S1113 is equivalent to 1005 in FIG. 10.

As described above, in the present exemplary embodiment, the search condition is generated based on the sheet information about the sheet loaded in the sheet feeding unit 107 of the printing apparatus 105 that issues an instruction for printing. As a result, the image data suitable for the printing apparatus 105 is selectively searched. Consequently, when the user gives an instruction for printing the image data found by the search based on the search condition, the user can obtain a highly satisfactory/a predetermined level of satisfaction printed product with a simple operation.

In the first exemplary embodiment, the processing using the sheet type of the sheet loaded in the printing apparatus 105 is not executed, in a case where the category is selected by the user in the screen in FIG. 5A. In a second exemplary embodiment, processing is executed using the sheet information (in particular, the sheet type) in a case where the user gives an instruction for a search using the category in the screen in FIG. 5A. The basic configuration of the present exemplary embodiment is similar to that of the first exemplary embodiment and therefore, a point different from the first exemplary embodiment will be described.

Figure 13:
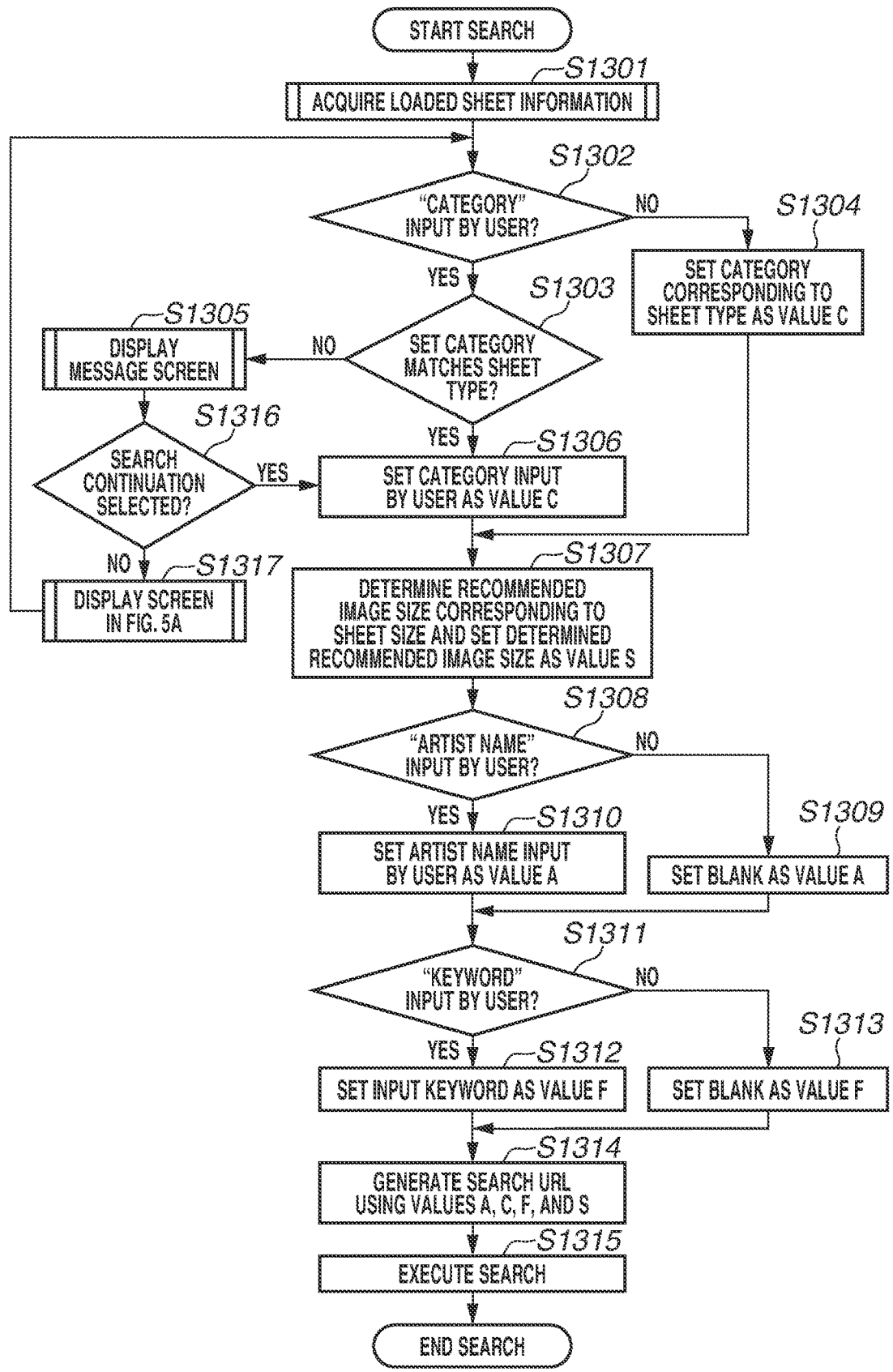
FIG. 13 is a flowchart illustrating search processing which is executed by the application.

The processing of the present exemplary embodiment will be described with reference to FIGS. 12 and 13. FIG. 13 is a flowchart illustrating search processing to be executed by the application 101. The CPU 201 reads out a program related to the processing procedure of the flowchart from the memory and executes the read-out program, to implement the processing in FIG. 13. The processing in FIG. 13 is executed in a case where the search button of any one of the items 501 to 503 in FIG. 5A is pressed.

Step S1301, step S1302, and step S1304 in FIG. 13 are similar to step S1101, step S1102, and step S1104 in FIG. 11, respectively, and therefore will not be described in detail.

In a case where the CPU 201 determines that the search processing using the category is selected (YES in step S1302), the processing proceeds to step S1303. In step S1303, the CPU 201 determines whether the category input by the user using the screen in FIG. 5A matches the sheet type acquired in step S1301. More specifically, the CPU 201 performs the determination in step S1303 based on the category information set in the screen in FIG. 5A and the recommended category table in FIG. 8. For example, A4-size Japanese paper is loaded in the sheet feeding unit 107 of the printing apparatus 105. Further, the user selects "Western painting" as the category using the screen in FIG. 5A and presses the search button. In this case, the CPU 201 identifies "matte paper" as the sheet type corresponding to "Western painting" by referring to the recommended category table in FIG. 8. As the processing result, the CPU 201 determines that the category "Western painting" input by the user and the sheet type (Japanese paper) acquired in step S1301 do not match each other (NO in step S1303), and the processing proceeds to step S1305. Alternatively, the CPU 201 identifies "block print, Japanese painting" as the category associated with the sheet type (Japanese paper) acquired in step S1301, by referring to the recommended category table in FIG. 8. As the processing result, the CPU 201 determines that the category "Western painting" set by the user and the category "block print, Japanese painting" associated with the sheet type (Japanese paper) acquired in step S1301 do not match with each other (NO in step S1303), and the processing proceeds to step S1305.

In step S1305, the CPU 201 displays a screen illustrated in FIG. 12. The screen in FIG. 12 displays a message saying that the category selected in the screen in FIG. 5A and the sheet loaded in the sheet feeding unit 107 of the printing apparatus 105 do not match each other. The sheet type information (in the present exemplary embodiment, "matte paper") recommended for the category selected in the screen in FIG. 5A is also displayed. The screen in FIG. 12 also displays an option 1201 indicating category change and an option 1202 indicating search continuation.

In step S1316, the CPU 201 determines an operation performed by the user in the screen in FIG. 12 (i.e., whether the option 1202 indicating search continuation is selected). In a case where the CPU 201 determines that the option 1202 indicating search continuation is selected by the user (YES in step S1316), the processing proceeds to step S1306. In a case where the CPU 201 determines that the option 1201 indicating category change is selected by the user (NO in step S1316), the processing proceeds to step S1317. In step S1317, the CPU 201 displays the screen in FIG. 5A again. In a case where the user presses the search button of any one of the items 501 to 503 in FIG. 5A, the CPU 201 executes step S1302. While step S1302 is executed after step S1317 in the above-described processing, step S1301 may be executed after step S1317.

In the above-described processing, the processing proceeds to step S1306 in a case where the CPU 201 determines that the option 1202 indicating search continuation is selected by the user. In step S1306, the CPU 201 may display a message that prompts the user to load a sheet corresponding to the selected category into the printing apparatus 105. More specifically, in the present exemplary embodiment, the CPU 201 may display a message that recommends loading matte paper into the printing apparatus 105 in a case where the option 1202 indicating search continuation is selected in the screen in FIG. 12.

With the above-described processing, the message is displayed for the user in a case where the category selected by the user and the sheet information about the sheet loaded in the sheet feeding unit 107 of the printing apparatus 105 that instructs printing do not match each other. With this configuration, a highly convenient/a predetermined level of convenient printing method can be provided.

While the CPU 201 generates the search condition based on the sheet information acquired from the printing apparatus 105 in the above-described exemplary embodiments, the search condition may be generated by another method. For example, at least one of the size and the type of a sheet usable by the printing apparatus 105 may be selected by the application 101, and the CPU 201 may read out the selected size or type from the disk device 202 of the information terminal 100 and generate the search condition based on the read-out size or type. In another method, the CPU 201 may read out at least one of the size and the type of the sheet used in the last printing from the disk device 202 of the information terminal 100, and generate the search condition based on the read-out size or type.

The CPU 201 may display a search result having less than or equal to the predetermined number of pieces of image data. For example, the CPU 201 receives information about the number of pieces of image data found in the image server 102 by the search, before returning the search result (1006). The CPU 201 requests the image server 102 to reduce the search result in a case where the number of pieces of image data found by the search is more than the predetermined number. With such processing, the image data having the large number of pixels may be excluded from the search result. Alternatively, the image data having the least number of pixels in the search result may be displayed as the search result. With such processing, transmission of image data having an unnecessarily large number of pixels from the image server 102 to the information terminal 100 can be prevented, whereby a load on network traffic can be reduced.

While the CPU 201 determines the number of pixels based on the sheet size acquired from the printing apparatus 105 and the table in FIG. 7 in the above-described exemplary embodiments, the CPU 201 may determine the number of pixels in a different way. For example, the CPU 201 may determine the number of pixels based on the sheet size and the sheet type acquired from the printing apparatus 105. For example, the CPU 201 determines 1500×1000 as the number of pixels in a case where A4 paper is acquired as the sheet size and plain paper is acquired as the sheet type. The CPU 201 may determine 1950×1300 as the number of pixels, in a case where A4 paper is acquired as the sheet size and photo paper is acquired as the sheet type. While, in the above-described exemplary embodiments, the search condition is generated based on both of the information set by the user in a screen such as the screen in FIG. 5A and the sheet information, another method may be used. For example, the search condition may be generated based on the sheet information acquired from the printing apparatus.

While the sheet information acquired from the printing apparatus 105 at the timing of pressing the print button after the search result is displayed is not used in the above-described exemplary embodiments, processing using the sheet information acquired from the printing apparatus 105 at the timing of pressing the print button may be executed. For example, in a case where the option 1202 indicating search continuation is selected in the screen in FIG. 12 of the second exemplary embodiment, the search result of the image data in the category of Western painting is displayed. If paper loaded in the printing apparatus 105 is not changed from Japanese paper while this search result is being displayed, and in a case where the user presses the print button in the screen displaying the search result, the CPU 201 acquires again the sheet information from the printing apparatus 105 and recognizes that Japanese paper is loaded. Then, the CPU 201 determines whether the category of the image data specified by the print instruction matches the recommended sheet type. For example, the CPU 201 executes determination similar to step S1303. The CPU 201 determines that the category of the image data specified by the print instruction and the sheet type loaded in the printing apparatus 105 do not match each other. Therefore, the CPU 201 may display a message after the print button is pressed. The message displayed in this processing is, for example, a message asking whether to continue printing, or a message that recommends changing the sheet of the printing apparatus 105 to matte paper.

The present disclosure can also be implemented by supplying software (a program) that implements functions of each of the above-described exemplary embodiments to a system or apparatus via a network or any of various storage media, and causing a computer of the system or apparatus to read out the program and execute the read-out program. In this case, the program and the storage medium storing the program are included in the present disclosure.

According to the present disclosure, a user can obtain an output result desired by a user at an improved chance.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-217777, filed Nov. 20, 2018, which is hereby incorporated by reference herein in its entirety.

What is claimed is:

1. An information processing apparatus capable of communicating with a printing apparatus and an image server, the information processing apparatus comprising:
a processor and a memory coupled to each other and to perform operations including:
acquiring sheet information about a sheet loaded in the printing apparatus,
generating a search condition for causing the image server to search for image data, based on the acquired sheet information,
causing the image server to execute search processing based on the search condition,
displaying a screen displaying a result of the search processing that is executed based on the search condition by the image server.

2. The information processing apparatus according to claim 1,
wherein size information about a sheet size is acquired as the sheet information about the sheet loaded in the printing apparatus, and
wherein generating includes generating the search condition including a number of pixels determined based on the sheet size information.

3. The information processing apparatus according to claim 2, wherein the perform operations further include storing recommended image size information in a storage,
wherein the recommended image size information indicates a sheet size and a number of pixels associated with each other, and
wherein generating includes determining the number of pixels based on the acquired sheet size information and the recommended image size information stored in the storage.

4. The information processing apparatus according to claim 1,
wherein type information about a sheet type is acquired as the sheet information about the sheet loaded in the printing apparatus,
wherein generating including generating the search condition including category information about image data, and
wherein the category information is determined based on the type information.

5. The information processing apparatus according to claim 4,
wherein the perform operations further include storing recommended category information in a storage,
wherein the recommended category information indicates a sheet type and category information associated with each other, and
wherein generating includes determining the category information based on the acquired type information and the recommended category information stored in the storage.

6. The information processing apparatus according to claim 1,
wherein displaying includes displaying a setting screen that receives setting information for causing the image server to search for image data, and
wherein the search condition is generated based on the setting information received in the setting screen and the acquired sheet information.

7. The information processing apparatus according to claim 6, wherein a screen including a message is displayed in a case where category information received as the setting information in the setting screen does not match with category information determined based on type information, in the acquired sheet information, about type of the sheet.

8. The information processing apparatus according to claim 7, wherein the screen including the message includes a first option for changing category information and a second option for continuing search processing.

9. The information processing apparatus according to claim 1, wherein the perform operations further include instructing the printing apparatus to perform print processing for image data selected from the screen displaying the result of the search processing.

10. A method for an information processing apparatus capable of communicating with a printing apparatus and an image server, the method comprising:
acquiring sheet information about a sheet loaded in the printing apparatus;
generating a search condition for causing the image server to search for image data, based on the acquired sheet information;
causing the image server to execute search processing based on the search condition; and
displaying a screen displaying a result of the search processing that is executed based on the search condition by the image server.

11. The method according to claim 10,
wherein size information about a sheet size is acquired as the sheet information about the sheet loaded in the printing apparatus, and
wherein generating includes generating the search condition including a number of pixels determined based on the sheet size information.

12. The method according to claim 11,
wherein the perform operations further include storing recommended image size information in a storage, wherein the recommended image size information indicates a sheet size and a number of pixels associated with each other, and
wherein generating includes determining the number of pixels based on the acquired sheet size information and the recommended image size information stored in the storage.

13. The method according to claim 10,
wherein type information about a sheet type is acquired as the sheet information about the sheet loaded in the printing apparatus,
wherein generating includes generating the search condition including category information about image data, and
wherein the category information is determined based on the type information.

14. The method according to claim 13,
wherein the perform operations further include storing recommended category information in a storage,
wherein the recommended category information indicates a sheet type and category information associated with each other, and
wherein generating includes determining the category information based on the acquired type information and the recommended category information stored in the storage.

15. The method according to claim 10,
wherein displaying includes displaying a setting screen that receives setting information for causing the image server to search for image data, and
wherein the search condition is generated based on the setting information received in the setting screen and the acquired sheet information.

16. The method according to claim 15, wherein a screen including a message is displayed in a case where category information received as the setting information in the setting screen does not match with category information determined based on type information, in the acquired sheet information, about type of the sheet.

17. The method according to claim 16, wherein the screen including the message includes a first option for changing category information and a second option for continuing search processing.

18. The method according to claim 10, wherein the perform operations further include instructing the printing apparatus to perform print processing for image data selected from the screen displaying the result of the search processing.

19. A non-transitory computer-readable storage medium storing a program to cause a computer to perform a method for an information processing apparatus capable of communicating with a printing apparatus and an image server, the method comprising:
    acquiring sheet information about a sheet loaded in the printing apparatus;
    generating a search condition for causing the image server to search for image data, based on the acquired sheet information;
    causing the image server to execute search processing based on the search condition; and
    displaying a screen displaying a result of the search processing that is executed based on the search condition by the image server.

* * * * *